Dec. 3, 1929.  H. L. ROE  1,737,866

METHOD OF AND APPARATUS FOR THE PRACTICE OF AGRICULTURE

Filed Oct. 10, 1923

INVENTOR
Hamilton L. Roe
by Clarke & Doolittle
his attorney.

Patented Dec. 3, 1929

1,737,866

UNITED STATES PATENT OFFICE

HAMILTON L. ROE, OF PITTSBURGH, PENNSYLVANIA

METHOD OF AND APPARATUS FOR THE PRACTICE OF AGRICULTURE

Application filed October 10, 1923. Serial No. 667,641.

This invention pertains to agriculture, and particularly to the preparation of soil prior to the planting of crops.

The present invention proposes to effect a fixation of atmospheric nitrogen into the soil without the introduction of fertilizers or other foreign substances.

Another purpose of the invention is to effect a destruction of the animal life in the earth before the planting of crops, killing worms, beetles, other insects, and their eggs and larvæ.

A further purpose of the invention is to kill existing or potential vegetable life in the ground before planting new crops, so as to forestall the growth of weeds and undesirable vegetation.

These three results may be obtained at the same time, while also purifying and sweetening the soil, and preferably during the ordinary process of plowing or harrowing.

The invention consists broadly in passing through the top or uppermost stratum of soil, high frequency electrical currents of a desired value.

In the drawings, which illustrate diagrammatically apparatus for carrying out the invention, Fig. 1 is a two-shared plow in which the shares constitute ground electrodes;

Figure 1:
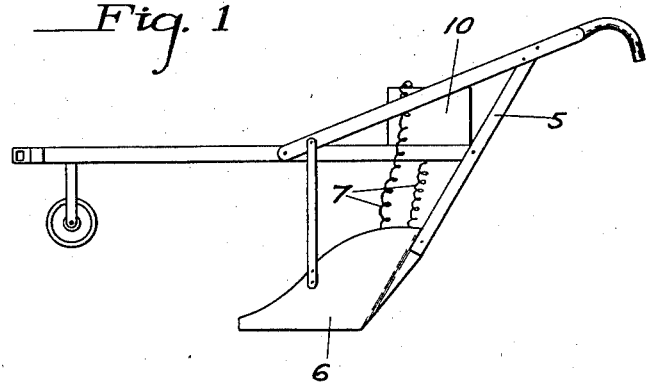
Figure 2:
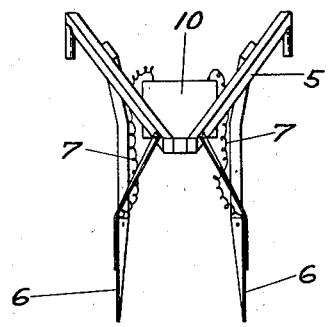
Fig. 2 is a front view thereof.

In the form of the invention shown in Figs. 1 and 2, 5 designates a suitable plow frame or other agricultural tool having a pair of spaced apart plow-shares or other earth working devices 6 thereon. The two shares 6 are connected to opposite terminals of a source of high frequency electric currents through wires 7. The two plates may be effectively insulated, the wooden frame assisting in insulating the two members.

Figure 3:
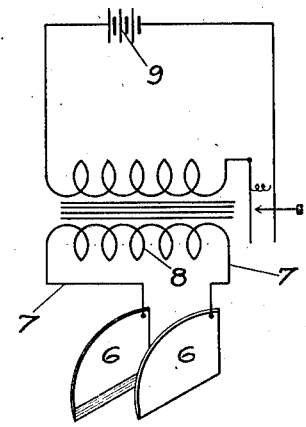
Fig. 3 is a circuit diagram for the plow.

This source of high frequency electricity may be of any suitable nature. I have illustrated the wires 7 as connecting to the secondary of an induction coil 8, see Fig. 3, energized from a suitable source of current such as a battery 9. The coil and battery, and such other equipment as may be required, can be housed in a casing 10 on the frame.

Figure 4:
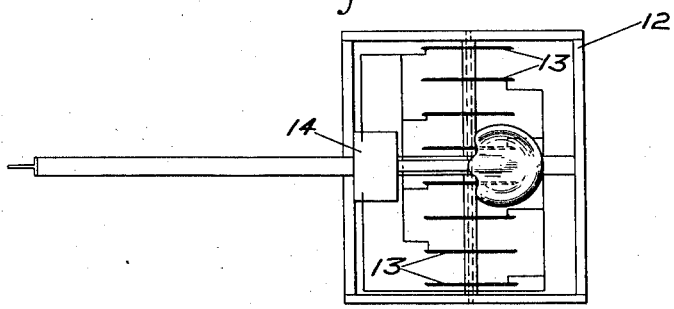
Fig. 4 is a plan view of a harrow embodying the principle of my invention.

In Fig. 4, I have illustrated the application of the invention to a multiple disk harrow, wherein 12 is the harrow frame, 13 the disks, and 14 the box wherein is housed the high frequency generator. Alternate disks are connected to like poles, so that a difference of potential may be maintained between each disk and those on each side of it.

My invention is in no wise limited to the construction shown, the drawings merely representing embodiments of my invention, showing its application to earth tilling implements.

When the plow-shares or harrow disks, or other oppositely charged implements, hereinafter referred to as electrodes, are pulled through the ground, high frequency current is passed through the soil intervening between the two electrodes. The ionizing effect of high frequency currents passing through loosened dry soil will function to produce in the soil a condition which, upon the soil becoming moistened, will result in a stimulated production of carbonate of ammonia. When the high frequency electrical currents pass through moist aerated soil, the formation of nitric acid, nitrous oxide, and ammonia will result. A certain amount of ozone will also be formed, which, especially in the presence of sunlight, will have an oxidizing action, aiding in sweetening the soil and preventing fermentation. The process, so far as fixation of nitrogen is concerned, may be best effected in fairly dry loose soil.

As the current flows through the soil from one electrode to the other, it will naturally pass through the insects, worms, larvæ, and eggs that are in the soil, thus practicaly exterminating them. Insects are best killed when the ground is moist.

The roots of weeds and various germinated seeds in the ground will also be destroyed by the same process.

Where the electrodes are the earth working implements, as shown in the drawings, it will be seen that, as the earth is opened up and loosened by the plowing or harrowing, and thus thoroughly aerated, the electrical treatment is concomitantly effected. However, the electrical soil treating process could, if desired, be effected by different means after the soil is opened and loosened.

The distance between the electrodes is preferably relatively small, so that currents of relatively small values may be effectively used. The current values impressed on the electrodes can be such as to give the best results under varying conditions. The current consumption, due to the high voltages required and the low amperage necessary, need not be great.

After an area of land has been treated one or more times, and it is insured that the entire area has been sufficiently covered, the crops may be planted. As the soil will be substantially free of injurious insects and worms that normally develop in the soil, and substantially free of weeds, the crops will have a good chance for growth. At the same time, the nitrogen compounds which have been electrically fixed in the soil will provide a vital element for the growth of the crops.

I claim as my invention:

1. The process of treating soil which consists in loosening the soil while discharging high frequency currents therethrough below the surface.

2. The process of treating soil which consists in loosening and aerating the soil while discharging high frequency currents therethrough below the surface.

3. The process of treating an area of land for agricultural purposes which consists in loosening the soil by spaced apart disturbing elements and impressing high voltage currents on the elements for the discharge of high frequency currents through the soil below its surface.

4. The process of treating soil which consists in loosening and aerating the soil while simultaneously discharging high frequency currents through the loosened and aerated soil.

5. The process of treating soil consisting in disturbing, loosening and aerating the soil between spaced apart tilling elements acting as electrodes and simultaneously impressing high voltage currents on the tilling elements and discharging high frequency currents through the soil between the elements.

6. The method of treating land consisting in disturbing a strip section thereof to loosen its width while simultaneously discharging high frequency currents across and through the width of the strip as it is disturbed.

7. The method of treating land consisting in disturbing, loosening and aerating a strip section thereof across the width of the strip while simultaneously discharging high frequency currents across and through the width of the strip below the surface of the soil as it is disturbed.

8. The process of treating an area of land for agricultural purposes which consists in loosening the soil by spaced apart disturbing elements constituting oppositely charged electrodes of a high frequency electric circuit and impressing high voltage currents on the electrodes for the discharge of high frequency currents through the soil below its surface simultaneously with its disturbance.

9. An agricultural implement having a plurality of spaced apart earth working elements each arranged for movement under the surface of the soil, each of which constitutes an electrode of a high frequency electric circuit.

10. An agricultural implement having a pair of spaced apart earth engaging electrodes adapted to be moved through the ground, and a source of high frequency current having one pole connected with one electrode and the other pole connected with the other electrode while the electrodes are positioned below the surface of the soil.

11. An agricultural implement comprising a frame, a plurality of earth working implements on the frame arranged for movement under the surface of the soil, some of the implements being insulated from the others, and means for maintaining high potential difference between the two sets of elements while positioned under the surface of the soil.

12. An agricultural implement comprising a frame, a plurality of earth working units thereon arranged to be moved through the soil in parallelism, said units being spaced one from another, alternate units being connected to the same side of an electric circuit, and a source of high frequency current in the circuit.

In testimony whereof I affix my signature.

HAMILTON L. ROE.